US012384355B2

(12) United States Patent
Iihoshi et al.

(10) Patent No.: US 12,384,355 B2
(45) Date of Patent: Aug. 12, 2025

(54) VEHICLE CONTROL DEVICE AND VEHICLE CONTROL METHOD

(71) Applicant: Hitachi Astemo, Ltd., Hitachinaka (JP)

(72) Inventors: Yoichi Iihoshi, Tokyo (JP); Takashi Okada, Hitachinaka (JP); Yuuki Okuda, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 409 days.

(21) Appl. No.: 17/907,822

(22) PCT Filed: Jan. 15, 2021

(86) PCT No.: PCT/JP2021/001189
§ 371 (c)(1),
(2) Date: Aug. 29, 2022

(87) PCT Pub. No.: WO2021/199580
PCT Pub. Date: Oct. 7, 2021

(65) Prior Publication Data
US 2023/0143238 A1 May 11, 2023

(30) Foreign Application Priority Data
Mar. 30, 2020 (JP) ................................ 2020-059456

(51) Int. Cl.
*B60W 20/11* (2016.01)
*B60L 58/12* (2019.01)
(Continued)

(52) U.S. Cl.
CPC .............. *B60W 20/11* (2016.01); *B60L 58/12* (2019.02); *B60W 10/06* (2013.01); *B60W 10/08* (2013.01);
(Continued)

(58) Field of Classification Search
CPC ...... B60W 10/06; B60W 10/10; B60W 10/11; B60W 10/02; B60W 10/08; B60W 10/26;
(Continued)

(56) References Cited

U.S. PATENT DOCUMENTS

2001/0025621 A1* 10/2001 Shiraishi ............. F02D 41/3023
903/917
2002/0083930 A1 7/2002 Robichaux et al.
(Continued)

FOREIGN PATENT DOCUMENTS

CN 105608918 A * 5/2016
CN 107809117 B * 9/2019 ................ H02J 3/32
(Continued)

OTHER PUBLICATIONS

International Search Report (PCT/ISA/210) issued in PCT Application No. PCT/JP2021/001189 dated Apr. 20, 2021 with English translation (six (6) pages).
(Continued)

*Primary Examiner* — Redhwan K Mawari
(74) *Attorney, Agent, or Firm* — Crowell & Moring LLP

(57) ABSTRACT

The present invention provides a vehicle control device capable of improving fuel consumption while reducing deterioration of emission by appropriately controlling a powertrain system of a vehicle. A vehicle control device includes: a prediction unit configured to predict speeds or accelerations of a vehicle based on a plurality of prediction models; a fuel consumption information calculation unit configured to calculate fuel consumption for each of a plurality of prediction results obtained by the prediction unit; a selection unit configured to select any one of the plurality of prediction results; and a powertrain control unit configured to control at least one of an engine, a generator, an inverter, a drive motor, and a transmission of the vehicle based on the prediction result selected by the selection unit.

6 Claims, 11 Drawing Sheets

(51) Int. Cl.
  *B60W 10/06* (2006.01)
  *B60W 10/08* (2006.01)
  *B60W 20/14* (2016.01)
  *B60W 40/12* (2012.01)
  *B60W 50/00* (2006.01)

(52) U.S. Cl.
  CPC ............ *B60W 20/14* (2016.01); *B60W 40/12* (2013.01); *B60W 50/0097* (2013.01); *B60W 2510/244* (2013.01); *B60W 2520/00* (2013.01); *B60W 2530/00* (2013.01)

(58) Field of Classification Search
  CPC .............. B60K 2006/268; B60K 6/445; B60L 2240/423; B60L 2240/545; B60L 2240/547; B60L 2240/549
  See application file for complete search history.

(56) References Cited

U.S. PATENT DOCUMENTS

| | | | | |
|---|---|---|---|---|
| 2003/0100404 A1* | 5/2003 | Matsumura | ............ | F16H 61/061 |
| | | | | 477/124 |
| 2004/0192499 A1* | 9/2004 | Sakamoto | ............ | B60W 10/02 |
| | | | | 477/107 |
| 2005/0059529 A1* | 3/2005 | Sakamoto | ............ | B60W 10/06 |
| | | | | 477/174 |
| 2010/0000809 A1* | 1/2010 | Nishi | ................... | H01M 10/48 |
| | | | | 320/132 |
| 2010/0152937 A1 | 6/2010 | Yamada et al. | | |
| 2015/0006000 A1 | 1/2015 | Kawata et al. | | |
| 2015/0298684 A1* | 10/2015 | Schwartz | ............ | B60W 40/02 |
| | | | | 180/65.265 |
| 2017/0284269 A1* | 10/2017 | Myojo | ................... | F01N 3/101 |
| 2019/0276002 A1 | 9/2019 | Ito | | |
| 2020/0357282 A1* | 11/2020 | Imanishi | ............... | G08G 1/166 |

FOREIGN PATENT DOCUMENTS

| | | | | | |
|---|---|---|---|---|---|
| JP | 2002-276478 | A | | 9/2002 | |
| JP | 2007-269256 | A | | 10/2007 | |
| JP | 2010-90839 | A | | 4/2010 | |
| JP | 2010-137702 | A | | 6/2010 | |
| JP | 2013-52804 | A | | 3/2013 | |
| JP | 2015-205682 | A | | 11/2015 | |
| JP | 2018-83574 | A | | 5/2018 | |
| JP | 2020145671 | A | * | 9/2020 | ........... H01L 21/764 |

OTHER PUBLICATIONS

Japanese-language Written Opinion (PCT/ISA/237) issued in PCT Application No. PCT/JP2021/001189 dated Apr. 20, 2021 (five (5) pages).

* cited by examiner

FIG. 5A
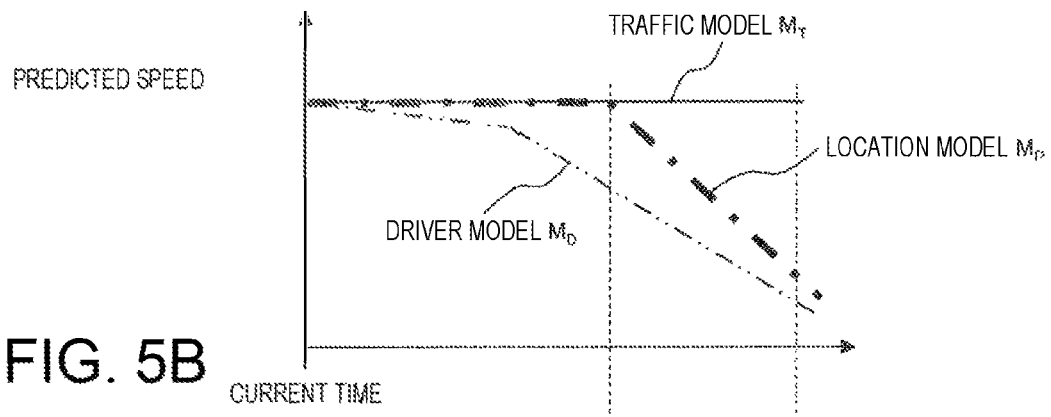
FIG. 5B
FIG. 5C
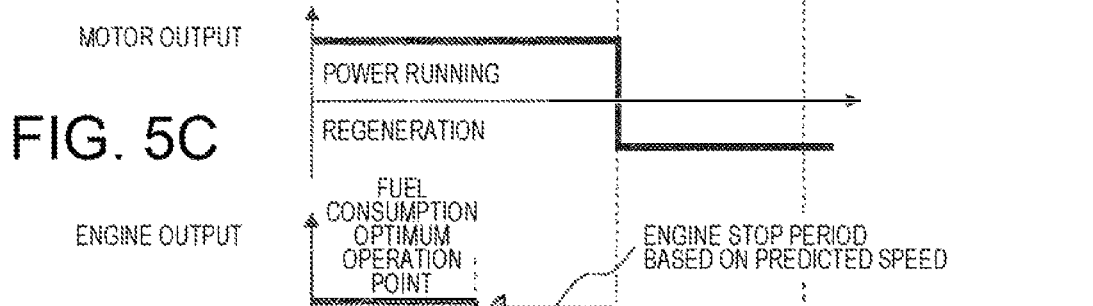
FIG. 5D
FIG. 5E
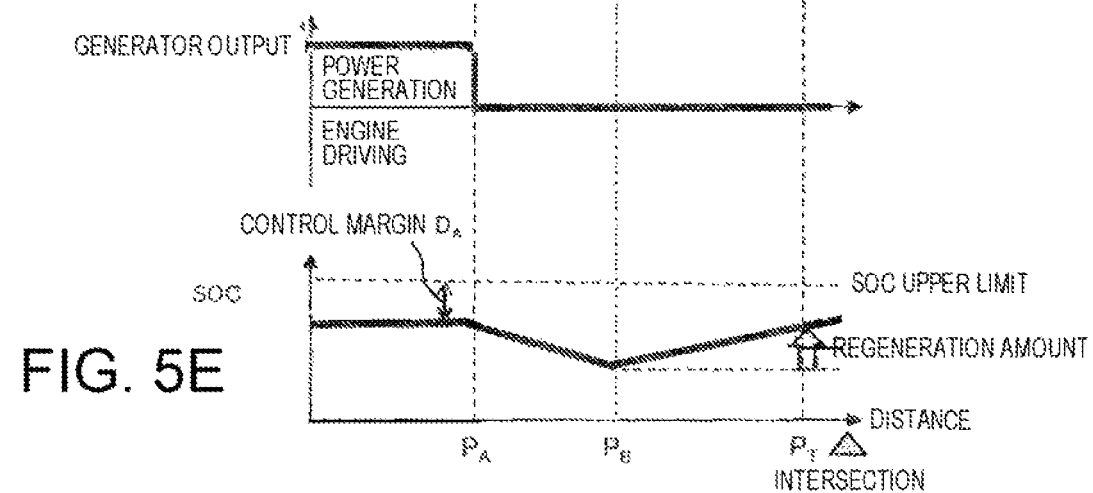

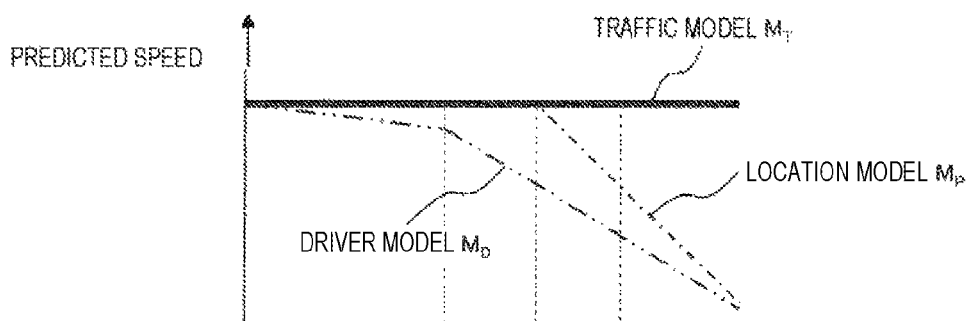
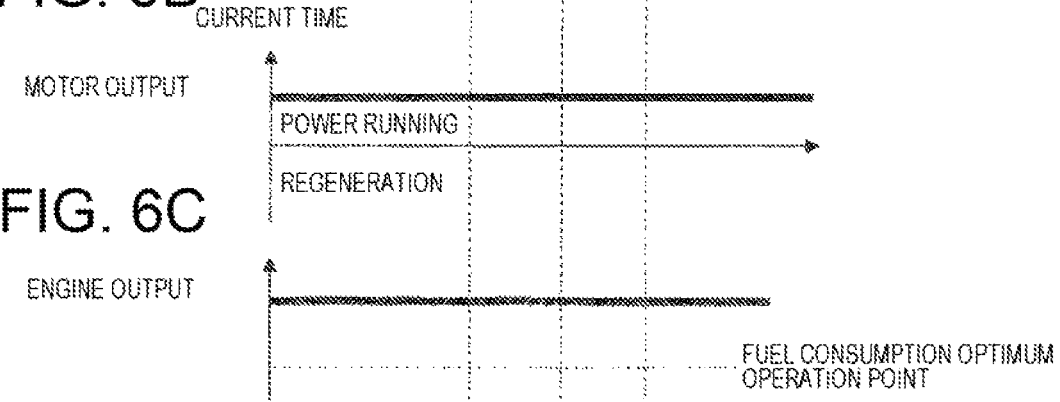
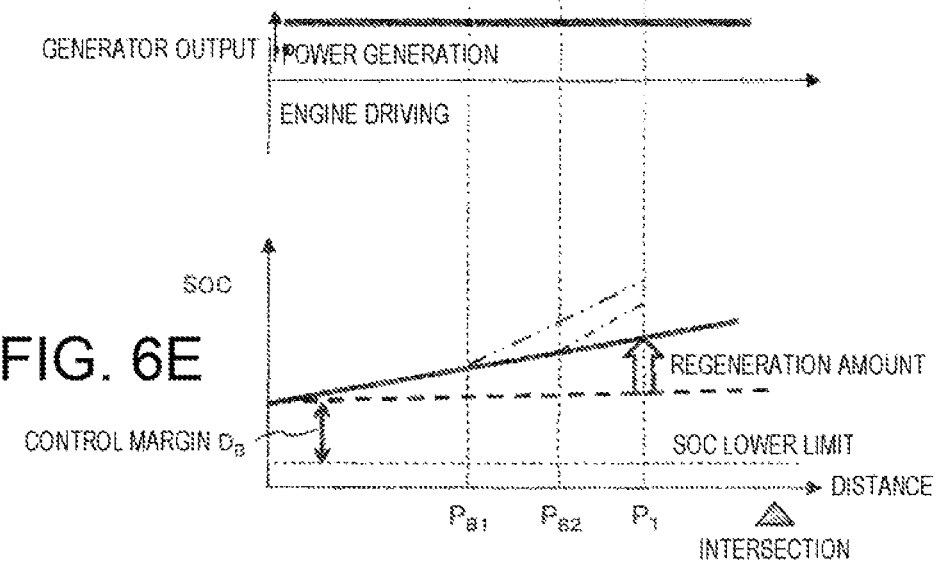

VEHICLE CONTROL DEVICE AND VEHICLE CONTROL METHOD

TECHNICAL FIELD

The present invention relates to a vehicle control device and a vehicle control method for controlling a powertrain system based on a predicted speed and a predicted acceleration of a user's vehicle.

BACKGROUND ART

In order to improve energy efficiency of a powertrain system ("fuel efficiency" of an engine and "electrical efficiency" of a drive motor, which are collectively referred to as "fuel consumption" hereinafter), a predictive fuel consumption improvement technology using a prediction information item on a traveling status has been developed.

For example, a hybrid vehicle has a problem that when a difference between an engine minimum fuel consumption torque and a required torque is small, a load of a regenerative motor decreases and conversion efficiency of the regenerative motor deteriorates. Therefore, in PTL 1, when deceleration is predicted, a gear position is changed in advance to reduce deterioration of the conversion efficiency of the regenerative motor.

In addition, in PTL 2, in order to control a battery state of charge (SOC), a future vehicle requested driving force is predicted based on a traveling status signal indicative of an accelerator pedal operation or the like, and a method of minimizing an amount of fuel consumed in an engine is selected among a plurality of engine output candidates and a plurality of gear ratio candidates satisfying the driving force.

CITATION LIST

Patent Literature

PTL 1: JP 2013-52804 A
PTL 2: JP 2007-269256 A

SUMMARY OF INVENTION

Technical Problems

However, PTL 1 and PTL 2 propose the configuration in which an optimum control method is selected from a plurality of control methods based on one prediction information item, but give no sufficient consideration to a case where a plurality of prediction information items having the same degree of accuracy can be obtained. Thus, there is a possibility that the plurality of prediction information items are not sufficiently used, and a fuel consumption reduction effect cannot be sufficiently obtained.

In addition, PTL 1 and PTL 2 do not refer to a case where the prediction information item is inaccurate, and an inaccurate prediction information item may conversely cause deterioration of fuel consumption and also deterioration of quality of emission such as increases in hydrocarbons (HC), carbon monoxide (CO), nitrogen oxides (NOx), and particulate number (PN).

The present invention has been made to solve the above problems, and aims to provide a vehicle control device and a vehicle control method capable of improving fuel consumption while reducing deterioration of emission by appropriately controlling a powertrain system of a vehicle.

Solutions to Problems

In order to solve the above problems, a vehicle control device according to the present invention includes: a prediction unit configured to predict speeds or accelerations of a vehicle based on a plurality of prediction models; a fuel consumption information calculation unit configured to calculate fuel consumption for each of a plurality of prediction results obtained by the prediction unit; a selection unit configured to select any one of the plurality of prediction results; and a powertrain control unit configured to control at least one of an engine, a generator, an inverter, a drive motor, and a transmission of the vehicle based on the prediction result selected by the selection unit.

Furthermore, a vehicle control method according to the present invention includes: a prediction step of predicting speeds or accelerations of a vehicle based on a plurality of prediction models; a fuel consumption information calculation step of calculating fuel consumption for each of a plurality of prediction results; a selection step of selecting any one of the plurality of prediction results; and a powertrain control step of controlling at least one of an engine, a generator, an inverter, a drive motor, and a transmission of the vehicle based on the prediction result selected.

ADVANTAGEOUS EFFECTS OF INVENTION

The vehicle control device or the vehicle control method according to the present invention can improve fuel consumption while reducing deterioration of emission by appropriately controlling the powertrain system of the vehicle.

BRIEF DESCRIPTION OF DRAWINGS

FIGS. 5A to 5E illustrate an example of a time chart in a case of adopting a location model.
FIGS. 6A to 6E illustrate an example of a time chart of fuel consumption variation calculation (based on a traffic model).

DESCRIPTION OF EMBODIMENTS

Hereinafter, embodiments of a vehicle control device according to the present invention will be described with reference to the drawings.

First Embodiment

With reference to FIGS. 1 to 8, a vehicle control device 1 according to a first embodiment of the present invention will be described.

<Overview of Powertrain Control System>

Figure 1:
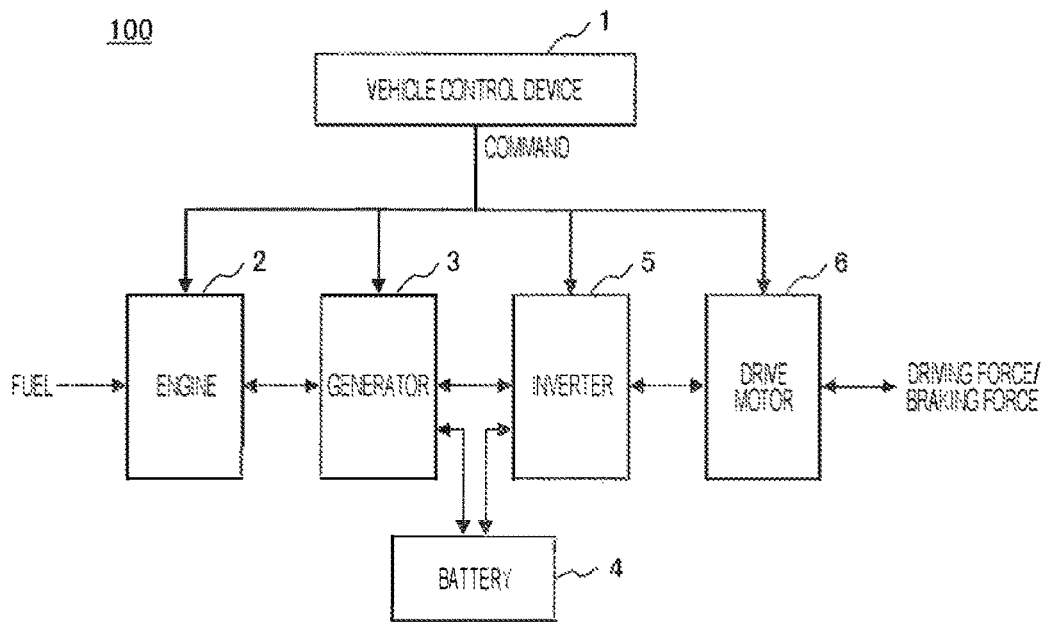
FIG. 1 is a schematic diagram of a powertrain control system according to a first embodiment.

FIG. 1 is a schematic diagram of a powertrain control system 100 mounted on a hybrid vehicle. As illustrated herein, this system includes the vehicle control device 1 according to the present embodiment and a powertrain system to be controlled by the vehicle control device 1. The powertrain system includes an engine 2, a generator 3, a battery 4, an inverter 5, a drive motor 6, a transmission not illustrated, and the like.

The vehicle control device 1 is an electronic control unit (ECU). The ECU transmits a command to increase engine efficiency or to reduce a regenerative loss to each component of the powertrain system, based on prediction information items on a user's vehicle speed and a user's vehicle acceleration (predicted speed $v_F$ and predicted acceleration $a_F$). Specifically, the vehicle control device 1 is a computer including hardware, for example, an arithmetic device such as a CPU, a main storage device such as a semiconductor memory, an auxiliary storage device, and a communication device. The vehicle control device 1 implements each of functions to be described later by allowing the arithmetic device to execute a corresponding one of programs loaded in the main storage device.

The engine 2 is an internal-combustion engine that burns a fuel such as gasoline and outputs engine torque.

The generator 3 includes a power generation unit that converts the engine torque into alternating current (AC) power and a rectifier that converts the AC power into direct current (DC) power. The generator 3 mainly supplies the DC power to the battery 4 and the inverter 5.

The battery 4 is a storage battery that is charged with the DC power supplied from the generator 3 and the inverter 5. Note that, a remaining capacity of the battery 4 is referred to as a state of charge (SOC) hereinafter.

The inverter 5 is a power conversion device that converts the DC power supplied from the generator 3 and the battery 4 into AC power and supplies the AC power to the drive motor 6, and that converts AC power supplied from the drive motor 6 into DC power and supplies the DC power to the battery 4 and the generator 3.

The drive motor 6 is an electric motor that generates a driving force and a braking force necessary for the vehicle. Herein, the drive motor 6 generates the driving force when receiving AC power from the inverter 5, and generates the braking force when supplying AC power (regenerative power) to the inverter 5.

<Functional Block Diagram of Vehicle Control Device 1>

Figure 2:
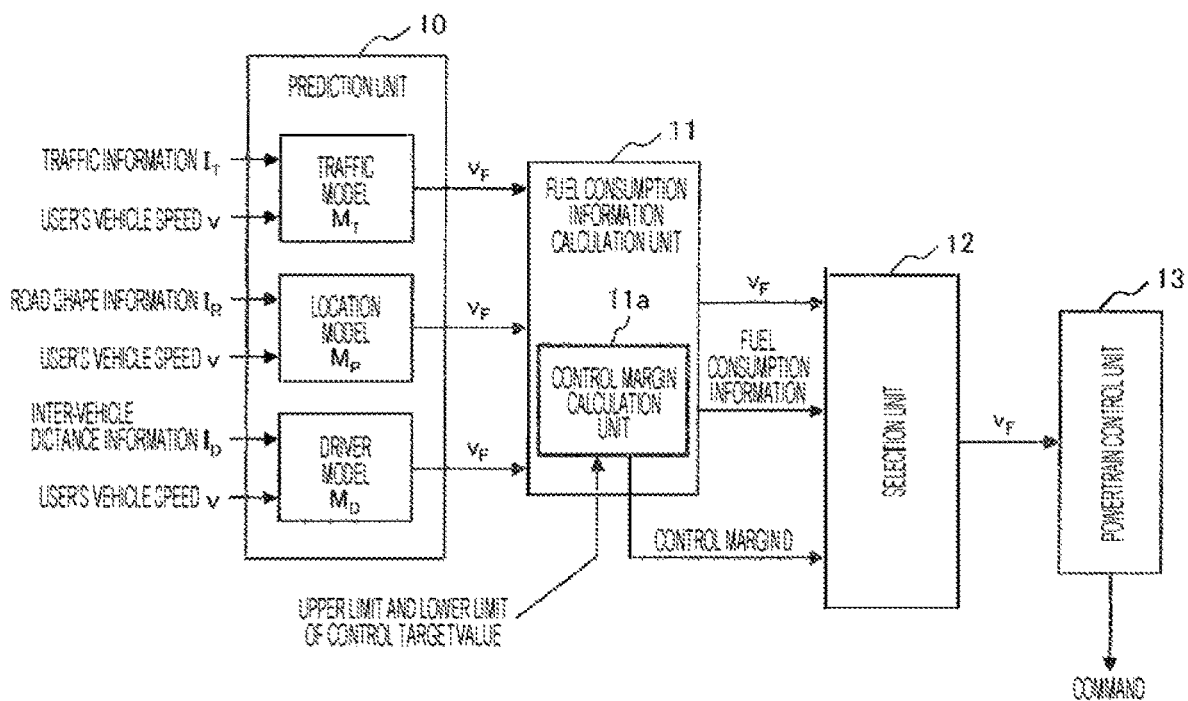
FIG. 2 is a functional block diagram of a vehicle control device according to the first embodiment.
Figure 3:
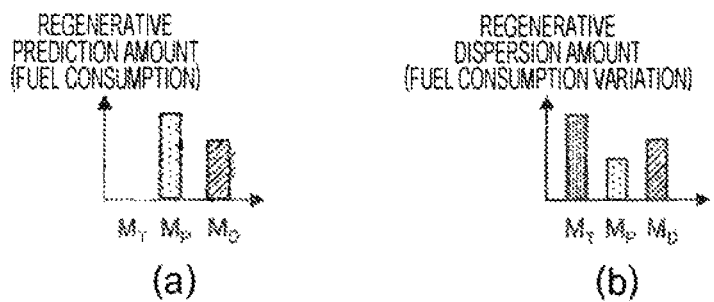
FIGS. 3A to 3B illustrate examples of regenerative prediction amounts and regenerative dispersion amounts for respective prediction models.

FIG. 2 illustrates an example of a functional block diagram of the vehicle control device 1. As illustrated herein, the vehicle control device 1 according to the present embodiment includes a prediction unit 10 that stores a plurality of prediction models M, a fuel consumption information calculation unit 11, a selection unit 12, and a powertrain control unit 13.

The plurality of prediction models M include, for example, but not limited to, the following three types.

(1) Traffic model $M_T$: a prediction model based on traffic volume characteristics, for calculating a predicted speed $v_F$ (or a predicted acceleration $a_F$) from traffic information items $I_T$ such as traffic congestion and accidents and a history of a user's vehicle speed v (or a user's vehicle acceleration a)

(2) Location Model $M_P$: a prediction model based on location characteristics, for calculating a predicted speed $v_F$ (or a predicted acceleration $a_F$) from road shape information items $I_R$ such as curves and intersections and a history of a user's vehicle speed v (or a user's vehicle acceleration a)

(3) Driver Model $M_D$: a prediction model based on driver characteristics, for calculating a predicted speed $v_F$ (or a predicted acceleration $a_F$) from an inter-vehicle distance information item $I_D$ between a preceding vehicle and a user's vehicle and a history of a user's vehicle speed v (or a user's vehicle acceleration a)

In the background art, a prediction result of any one of a plurality of prediction models M is selected based on a driving condition, a past prediction accuracy, and the like, and powertrain control for optimum fuel consumption is performed on one selected traveling speed prediction pattern. However, it is often difficult to determine which of the plurality of prediction information items has a higher accuracy.

To address such a situation, in the vehicle control device 1 according to the present embodiment, when any of the prediction results (predicted speeds $v_F$ and the predicted accelerations $a_F$) derived from the plurality of prediction models M obtained by the prediction unit 10 is likely to have a higher accuracy, a prediction model M to be adopted is selected in consideration of control margins D to be described later.

Thus, first, the fuel consumption information calculation unit 11 calculates fuel consumption information items for respective prediction results of the prediction models M. The fuel consumption information items calculated according to the present embodiment include fuel consumption and fuel consumption variations in the cases of adopting the prediction results of the prediction models M. Furthermore, the fuel consumption information calculation unit 11 includes a control margin calculation unit 11a, and calculates control margins. The control margins are each a difference between an upper limit or a lower limit of a control target value received from an external database and a predicted control value in the case of adopting a corresponding one of the prediction results of the prediction models M.

Next, the selection unit 12 selects one of the prediction models M according to the calculated control margins. Specifically, the selection unit 12 selects, for a large control margin, a prediction model M indicating maximum fuel consumption and selects, for a small control margin, a prediction model M indicating a minimum fuel consumption variation.

The powertrain control unit 13 transmits a command to the powertrain system (engine 2, generator 3, drive motor 6, transmission, and the like) so as to implement the predicted speed $v_F$ (or the predicted acceleration $a_F$) according to the selected prediction model M. Thus, robust and fuel consumption saving powertrain control is achieved.

<Application Example to SOC Control>

Hereinafter, a description will be given in detail of a case where the vehicle control device 1 according to the present embodiment is applied to the state of charge (SOC) control of the battery 4. Hereinafter, since a control value is set to the SOC, it is assumed that information items on an upper limit and a lower limit of a SOC target value are input to the control margin calculation unit 11a.

FIG. 3(a) is a graph schematically illustrating "regenerative prediction amounts", which correspond to the fuel consumption in the SOC control, for respective prediction models M. The regenerative prediction amounts can be calculated from a vehicle weight and predicted values of acceleration and deceleration. In this case, the regenerative prediction amounts after travel of predetermined time or a predetermined distance are calculated. Note that, in this example, the regenerative prediction amount (fuel consumption) of the location model $M_P$ is the maximum.

Meanwhile, FIG. 3(b) is a graph schematically illustrating "regenerative dispersion amounts", which correspond to the fuel consumption variations in the SOC control, for respective prediction models M. As will be described later in detail with reference to FIGS. 6 to 8, the regenerative dispersion amounts are each a difference between the maximum value and the minimum value of the regenerative prediction amounts of the plurality of prediction models M. Note that, in this example, the regenerative dispersion amount (fuel consumption variation) of the location model $M_P$ is minimum.

Figure 4:
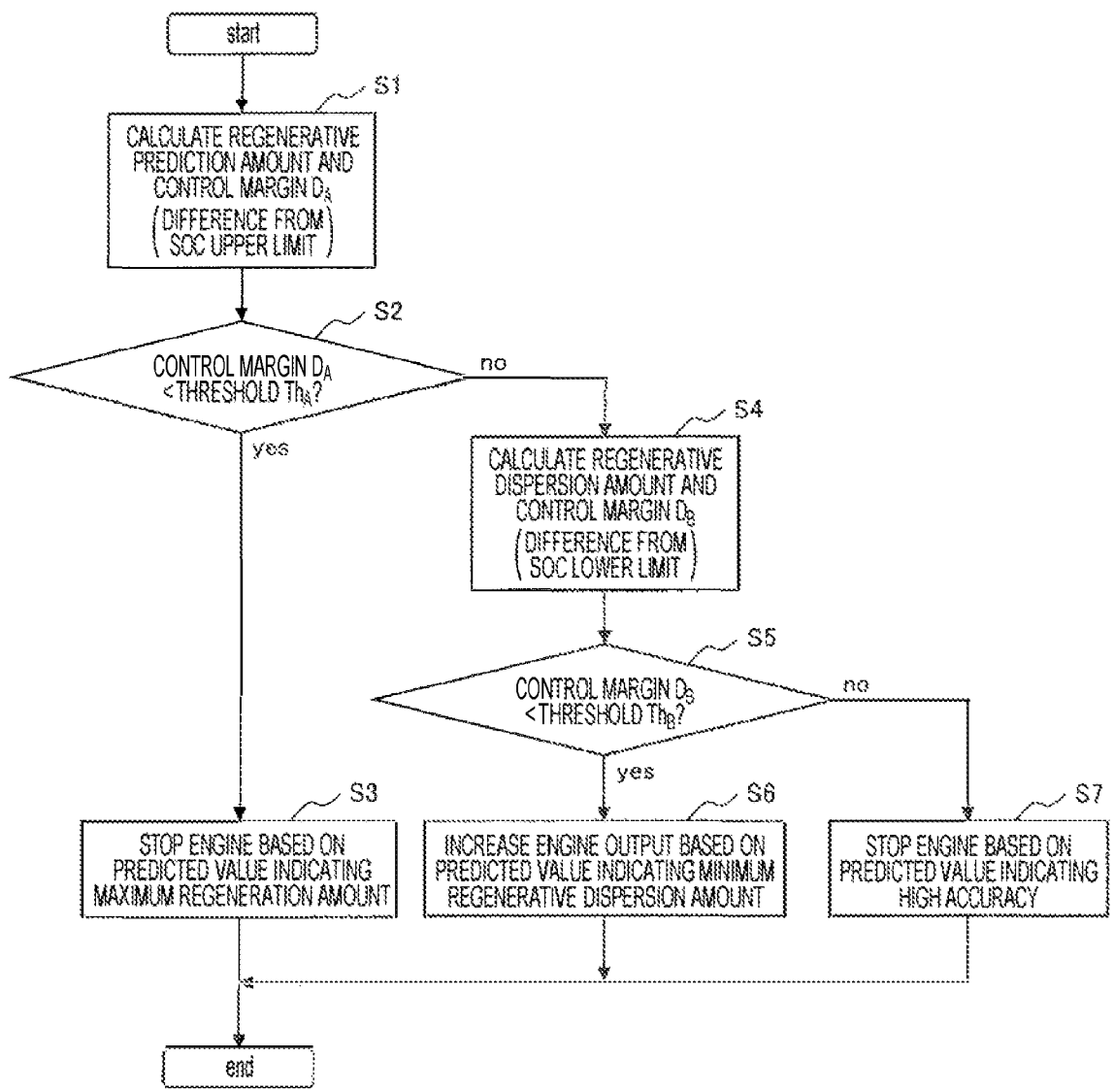
FIG. 4 is a flowchart of powertrain control according to the first embodiment.
Figure 7A:
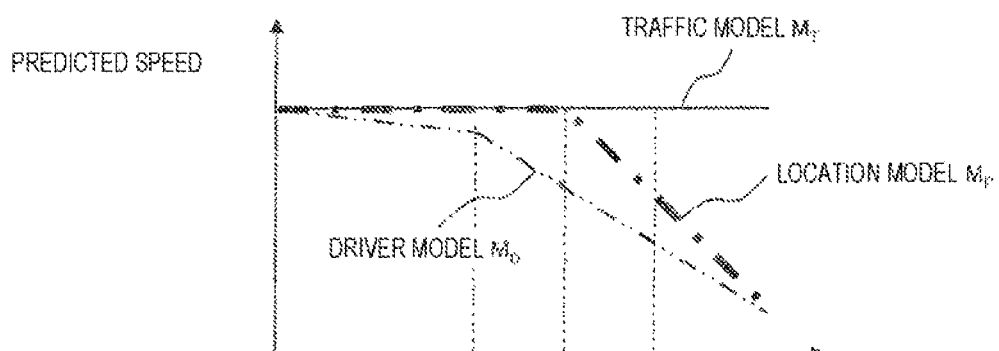
FIGS. 7A to 7E illustrate an example of a time chart of fuel consumption variation calculation (based on the location model).
Figure 7B:
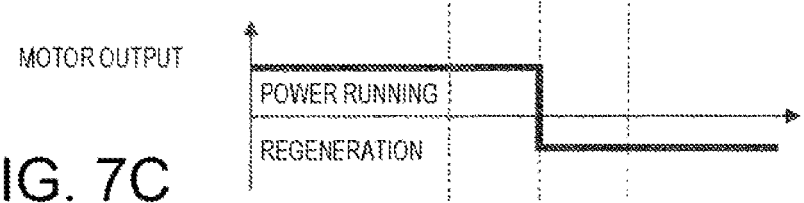
Figure 7C:
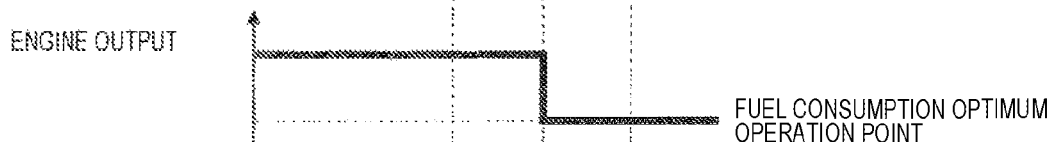
Figure 7D:
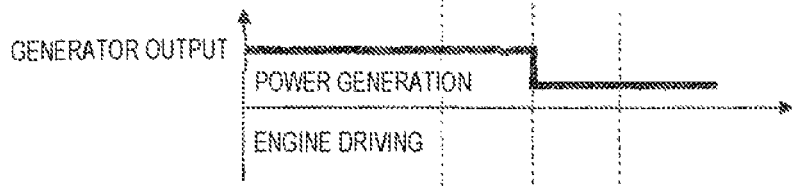
Figure 7E:
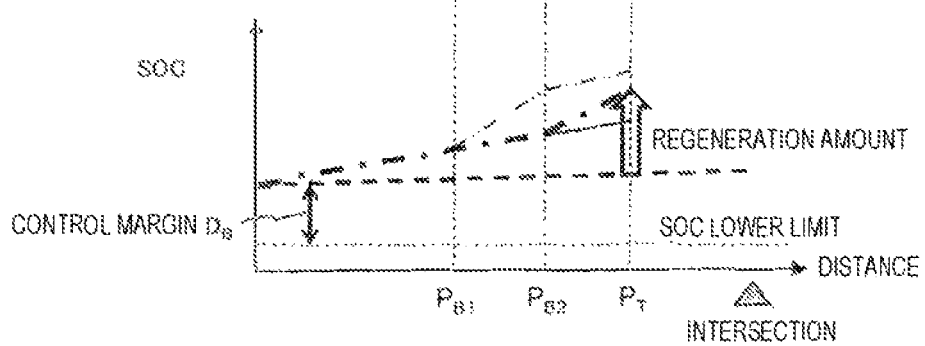
Figure 8A:
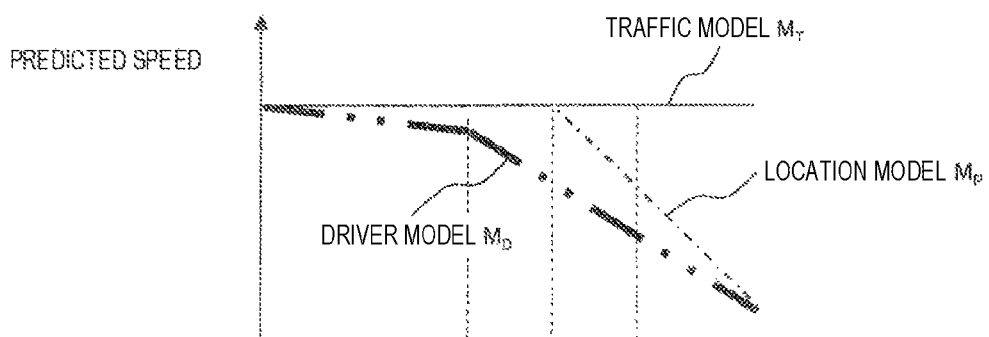
FIGS. 8A to 8E illustrate an example of a time chart of fuel consumption variation calculation (based on a driver model).
Figure 8B:
Figure 8C:
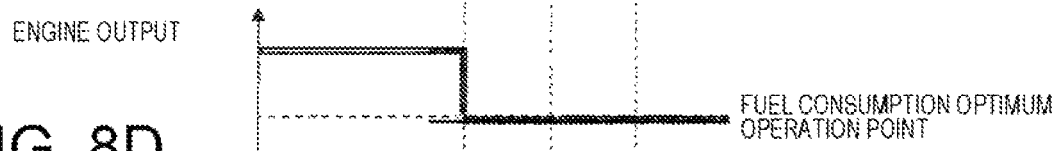
Figure 8D:
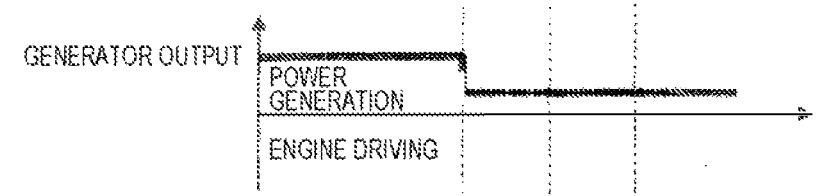
Figure 8E:
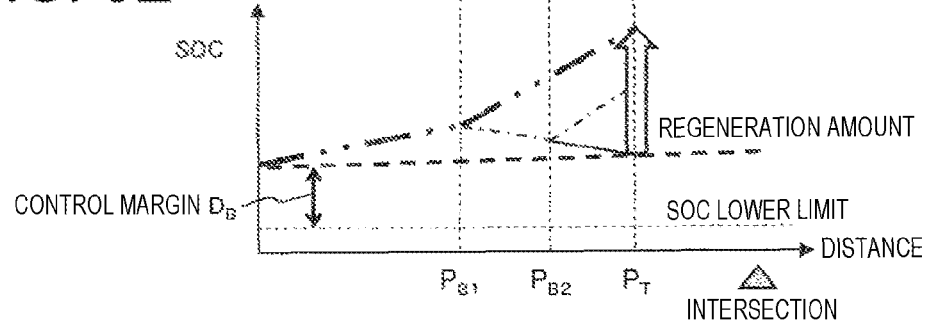

FIG. 4 illustrates an example of a flowchart of powertrain control for optimizing the SOC control.

First, in step S1, the fuel consumption information calculation unit 11 calculates regenerative prediction amounts corresponding to respective predicted speeds $v_P$ (or predicted accelerations $a_F$) derived from the plurality of prediction models M. In addition, the control margin calculation unit 11a subtracts a predicted SOC amount from the upper limit of the SOC target value to calculate a control margin $D_A$.

In step S2, the selection unit 12 determines whether the control margin $D_A$ is less than a threshold $Th_A$. The process proceeds to step S3 when the control margin $D_A$ is less than the threshold $Th_A$, otherwise the process proceeds to step S4.

In step S3, the selection unit 12 selects a prediction result indicating a maximum regeneration amount among a plurality of prediction results, and stops the engine based on the selected prediction result, thereby reducing the SOC such that the maximum regeneration amount can be recovered.

On the other hand, in step S4, the fuel consumption information calculation unit 11 calculates regenerative dispersion amounts corresponding to the plurality of predicted speeds $v_F$ (or the plurality of predicted accelerations $a_F$). Specifically, for the powertrain control in which the maximum regeneration amount is obtained for a certain predicted speed, a variance is obtained from the regeneration amount after travel of predetermined time or a predetermined distance in a case where another predicted speed is selected. In addition, the control margin calculation unit 11a subtracts the lower limit of the SOC target value from the predicted SOC amount to calculate a control margin $D_B$.

In step S5, the selection unit 12 determines whether the control margin $D_B$ is less than a threshold $Th_B$. The process proceeds to step S6 when the control margin $D_B$ is less than the threshold $Th_B$, otherwise the process proceeds to step S7.

In step S6, the selection unit 12 selects a prediction result indicating a minimum regenerative dispersion amount among the plurality of prediction results, and increases an output of the engine, thereby increasing the SOC.

On the other hand, in step S7, the selection unit 12 selects a prediction result indicating the highest accuracy in the past among the plurality of prediction results, and stops the engine. Note that, the accuracy as referred to herein may be the accuracy of the prediction model M verified at the time of design, or may be obtained by comparing a prediction result with an actual travel result and accumulating a prediction accurate rate.

With such a configuration, it is possible to select an appropriate prediction model M according to the current SOC. That is, when the SOC is near the upper limit of the target value, the engine is stopped before an actual deceleration start to reduce a regenerative loss of regenerative energy. Thus, the fuel consumption can be improved. On the other hand, when the current SOC is near the lower limit of the target value, an operating point of the engine is set to a maximum efficiency point before the actual deceleration start to increase efficient engine operating time. Thus, the fuel consumption can be improved.

<Example of Time Chart in Step S3>

FIG. 5 illustrates an example of a time chart in a case of selecting the predicted speed $v_F$ of the location model $M_P$ indicating the maximum regeneration amount.

FIG. 5(a) illustrates the predicted speed $v_F$ until the vehicle reaches the intersection. Since the predicted value of the traffic model $M_T$ indicated by a solid line does not provide a prediction about deceleration at all, the predicted regeneration amount of the traffic model $M_T$ is zero. As can be seen from a comparison between the location model $M_P$ indicated by a long dashed short dashed line and the driver model $M_D$ indicated by a long dashed double-short dashed line, the location model $M_P$ having a steeper deceleration indicates the maximum regeneration amount.

FIGS. 5(b) to 5(d) illustrate control plans of the drive motor 6, the engine 2, and the generator 3 calculated based on the predicted speed $v_F$ of the location model $M_P$ (see the long dashed short dashed line in FIG. 5(a)).

The output of the drive motor 6 illustrated in FIG. 5(b) indicates that the driving force is being generated when the output is positive (power running), and that the braking force is being generated when the output is negative (regeneration).

In the present embodiment, the output of the engine 2 illustrated in FIG. 5(c) is controlled to maintain a fuel consumption optimum point during a steady operation, and becomes zero when the engine is stopped.

The output of the generator 3 illustrated in FIG. 5(d) indicates that power is being generated when the output is positive, and that a force for driving the engine 2 is being generated when the output is negative.

FIG. 5(e) illustrates a predicted value of the SOC in a case where the powertrain is controlled according to the control plans. In the present embodiment, in order to charge the battery 4 with the regeneration amount in the section from a deceleration start prediction point $P_B$ to a target point $P_T$ of the predicted speed $v_F$ of the location model $M_P$, the engine 2 is stopped at a point $P_A$ further before the deceleration start prediction point $P_B$, and power is supplied from the battery 4 to lower the SOC.

In this example, the regeneration amounts corresponding to the three predicted speeds $v_F$ of the traffic model $M_T$, the location model $M_P$, and the driver model $M_D$ are calculated, and the engine 2 is stopped in advance and the SOC is reduced such that all the regeneration amounts can be recovered to the battery 4 even if the maximum regeneration amount occurs. When this control is performed, the engine 2 is stopped before deceleration regeneration actually starts, and the SOC is reduced such that all deceleration regeneration amounts can be absorbed by using the drive motor 6 while the engine is stopped. By performing such control, the maximum fuel consumption efficiency can be achieved when the prediction is accurate, and even when the prediction is inaccurate, a margin in the SOC eliminates necessity to perform an inefficient engine restart operation to recover the SOC.

<Example of Time Chart in Step S4>

Next, a method of calculating the regenerative dispersion amounts (fuel consumption variations) corresponding to the predicted speeds $v_F$ derived from the three types of prediction models M will be described in detail with reference to time charts of FIGS. 6 to 8.

Part (a) in each of FIGS. 6 to 8 illustrates the predicted speeds $v_F$ until the vehicle reaches the intersection, which are derived from the three types of prediction models M. A thick line indicates the prediction model M selected in each drawing. In addition, part (e) in each of FIGS. 6 to 8 illustrates a predicted value of the SOC in a case where the control (see parts (b) to (d) in each of FIGS. 6 to 8) for the maximum regeneration amount is performed based on the selected predicted speed $v_F$.

FIG. 6 illustrates an example of a result of calculating a regeneration amount based on the predicted speed $v_F$ of the traffic model $M_T$. In this example, the predicted speed $v_F$ is a constant speed (see FIG. 6(a)), and an operation is performed in an inefficient state in which the output is higher than that in a fuel consumption optimum operation state even during the steady operation in order to increase the SOC (see FIG. 6(c)). Here, as illustrated in FIG. 6(e), a predicted value of the SOC (long dashed double-short dashed line) in a case where the prediction of the driver model $M_D$ is accurate is also calculated from the deceleration start prediction point $P_{B1}$, and a predicted value of the SOC (long dashed short dashed line) in a case where the prediction of the location model $M_P$ is accurate is also calculated from the deceleration start prediction point $P_{B2}$. In this manner, the three types of regeneration amounts at the point $P_T$ can be predicted. In this example, since the predicted regeneration amount at the point $P_T$ of the traffic model $M_T$ is smaller than the predicted regeneration amounts of the other prediction models M, it can be evaluated that there is no fuel consumption improvement effect obtained by adopting the traffic model $M_T$, and the traffic model $M_T$ is not a selection candidate.

FIG. 7 illustrates an example of a result of calculating a regeneration amount based on the predicted speed $v_F$ of the location model M. In this case, the fuel consumption improvement is achieved by returning the engine 2 to the optimum operation point in accordance with the deceleration at the deceleration start prediction point $P_{B2}$ of the predicted speed $v_F$ of the location model $M_P$ (see FIG. 7(c)).

Furthermore, a predicted value of the SOC (long dashed double-short dashed line) in the case where the predicted speed $v_F$ of the driver model $M_D$ is accurate is also calculated from the deceleration start prediction point $P_{B2}$, and a predicted value of the SOC (solid line) in a case where the prediction of the traffic model $M_T$ is accurate is also calculated from the deceleration start prediction point $P_{B2}$. In this manner, the three types of regeneration amounts at the point $P_T$ can be predicted. In this example, since the predicted regeneration amount of the location model $M_P$ is larger than the predicted regeneration amount of the traffic model $M_T$, it can be evaluated that there is a fuel consumption improvement effect obtained by adopting the location model $M_P$, and the location model $M_P$ is a selection candidate. The variance of the regeneration amounts can be calculated as a difference between the maximum value and the minimum value of the three regeneration amounts.

FIG. 8 illustrates an example of a result of calculating a regeneration amount based on the predicted speed $v_F$ of the driver model $M_D$. In this case, the fuel consumption improvement is achieved by returning the engine 2 to the fuel consumption optimum operation state in accordance with the deceleration at the deceleration start prediction point $P_{B2}$ of the predicted speed $v_F$ of the driver model $M_D$ (see FIG. 8(c)). Furthermore, a predicted value of the SOC (long dashed short dashed line) in a case where the predicted speed $v_F$ of the location model $M_P$ is accurate is also calculated from the deceleration start prediction point $P_{B1}$, and a predicted value of the SOC (solid line) in a case where the prediction of the traffic model $M_T$ is accurate is also calculated from the deceleration start prediction point $P_{B2}$. In this manner, the three types of regeneration amounts at the point $P_T$ can be predicted. In this example, the fuel consumption reduction effect of the driver model $M_D$ is maximum, but the variation with respect to the regenerative amounts of the other prediction models M is larger than that in FIG. 7.

Thus, in the examples of FIGS. 6 to 8, the predicted speed $v_F$ of the location model $M_P$ indicating the smallest variation in the regeneration amount and the second largest regeneration amount is adopted (see FIG. 7). Note that, for the sake of simplicity, the present embodiment does not particularly refer to recovery control performed when the prediction is inaccurate. However, even in a case of performing the recovery control, it is possible to achieve the fuel consumption saving and robust powertrain control by selecting the prediction result from the similar viewpoint.

As described above, the vehicle control device 1 according to the present embodiment can improve fuel consumption while reducing deterioration of emission by selecting the prediction model M in which the regeneration amount increases and the variation in the regeneration amount decreases and controlling the powertrain system of the vehicle.

Second Embodiment

With reference to FIGS. 9 to 13, a vehicle control device 1 according to a second embodiment of the present invention will now be described. Note that a duplicate description of points common to the first embodiment will be omitted.

Figure 9:
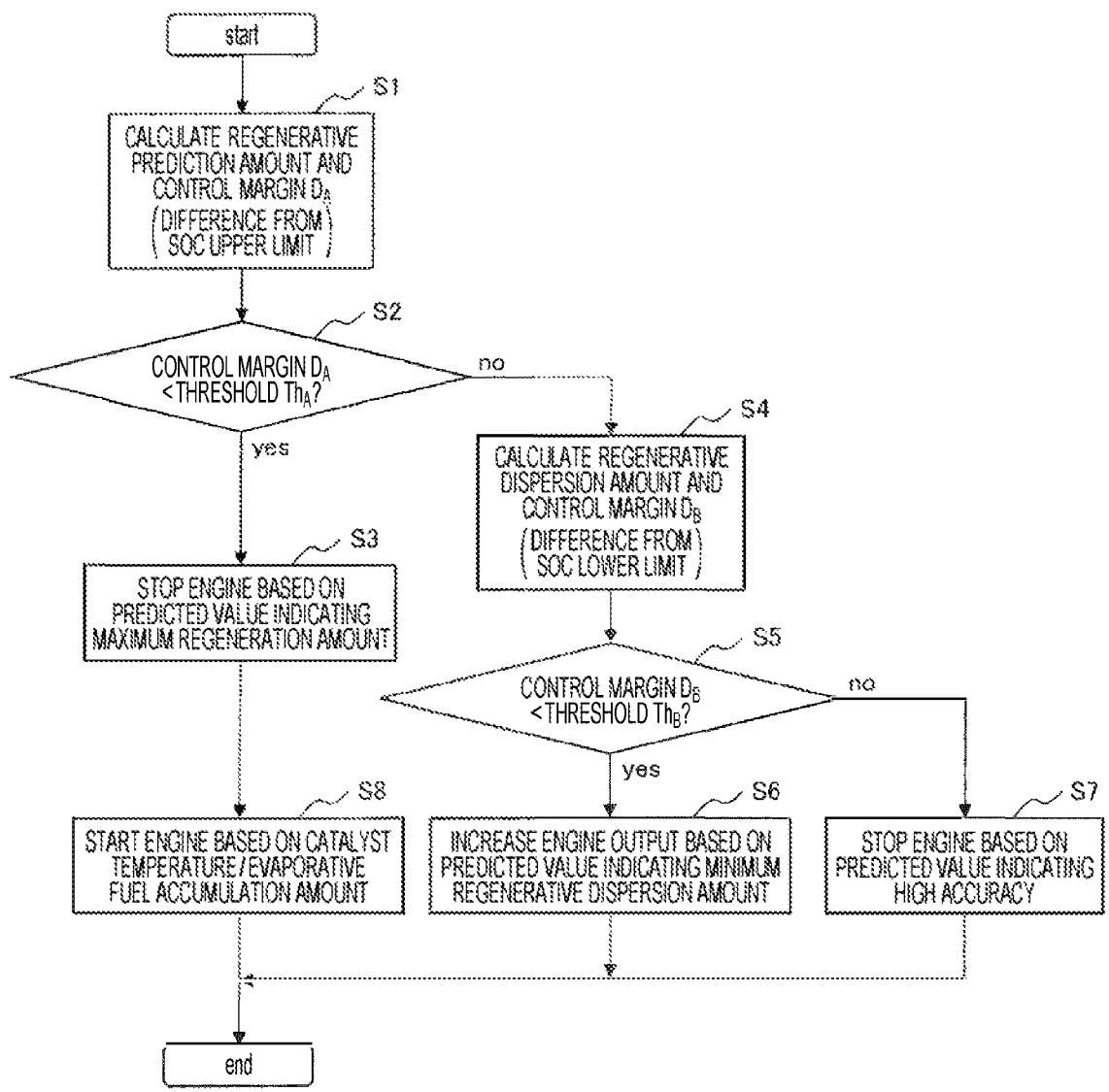
FIG. 9 is a flowchart of powertrain control according to a second embodiment.

FIG. 9 illustrates an example of a flowchart according to the present embodiment. The difference from the flowchart in FIG. 4 of the first embodiment is addition of step S8. In step S8, a timing of restarting the engine is determined based on a catalyst temperature or an evaporative fuel accumulation amount, thereby preventing deterioration of the emission.

<Case of Restarting Engine Based on Catalyst Temperature>

Figure 10:
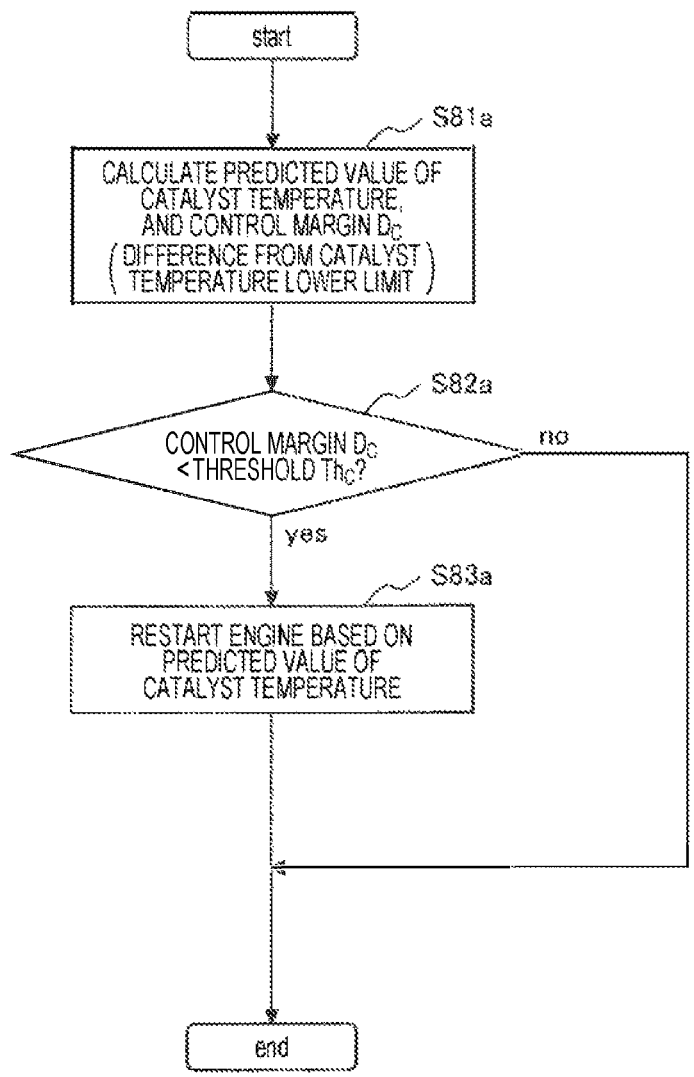
FIG. 10 illustrates an example of a flowchart of step S8 in FIG. 9.
Figure 11A:
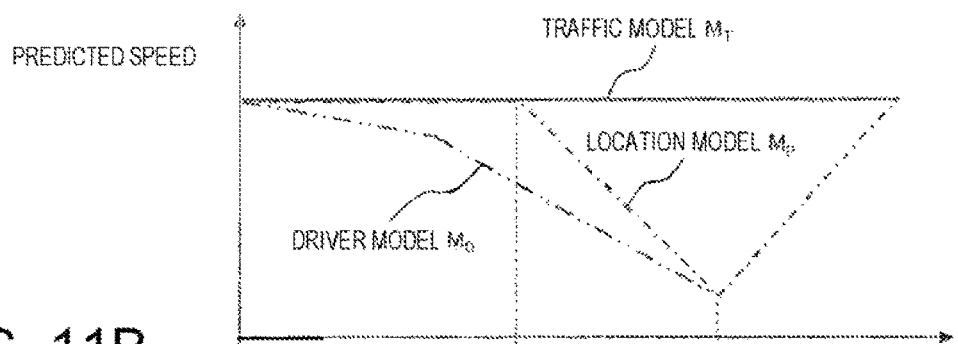
FIGS. 11A to 11E illustrate an example of a time chart of the second embodiment.
Figure 11B:
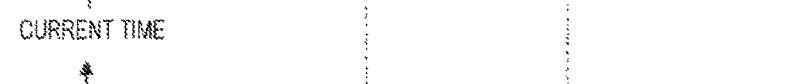
Figure 11C:
Figure 11D:
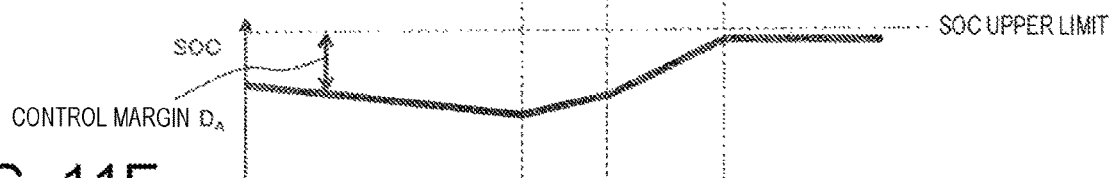
Figure 11E:
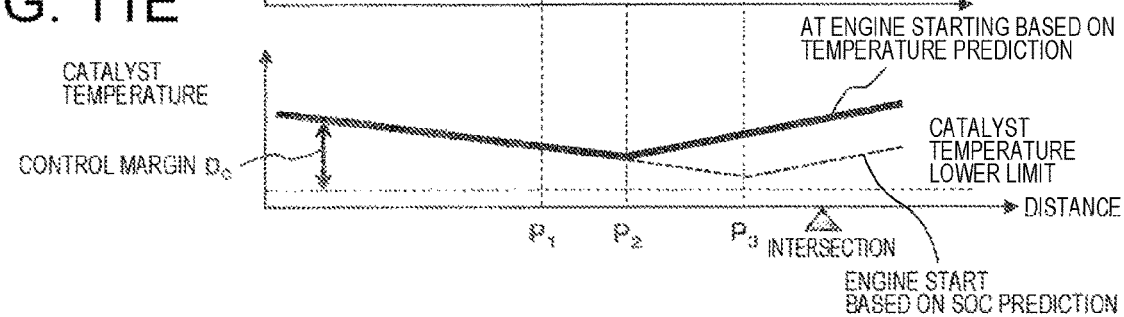

FIG. 10 illustrates an example of a flowchart for determining an engine restart based on a temperature estimation value of a catalyst that purifies exhaust of the engine 2, and illustrates step S8 in FIG. 9 in an exploded manner.

In step S81a, the catalyst temperature is estimated from the powertrain control plan determined according to the prediction model M, and further, a control margin $D_C$, which is the difference between the estimated catalyst temperature and a lower limit of the catalyst temperature, is calculated.

Then, in step S82a, determination is made whether the control margin $D_C$ is less than the threshold $Th_C$. When the control margin $D_C$ is less than the threshold $Th_C$, in step S83, control is performed such that the engine restart is performed at a point earlier than a conventional restart point (point at which deceleration ends) in order to prevent deterioration of the emission which is caused by a decrease in catalyst temperature.

FIG. 11 illustrates an example of a time chart in a case where the engine 2 is restarted based on a catalyst temperature estimation value. In this case, since the control margin $D_A$ of the SOC is small (see FIG. 11(e)), the engine is stopped before the deceleration is started (see FIG. 11(c)), and the control for reducing the SOC is performed. However, when a decrease in the catalyst temperature while the engine is stopped is estimated, and the control margin $D_C$ between the estimated catalyst temperature and the lower limit of the catalyst temperature is smaller than the predetermined value (see FIG. 11(f)), the engine is restarted at a point $P_2$ before a point $P_3$ where the regeneration amount is maximized (see FIG. 11(c)). Thus, the deterioration of the emission which is caused by the decrease in the catalyst temperature is prevented.

<Case of Restarting Engine Based on Evaporative Fuel Accumulation Amount>

Figure 12:
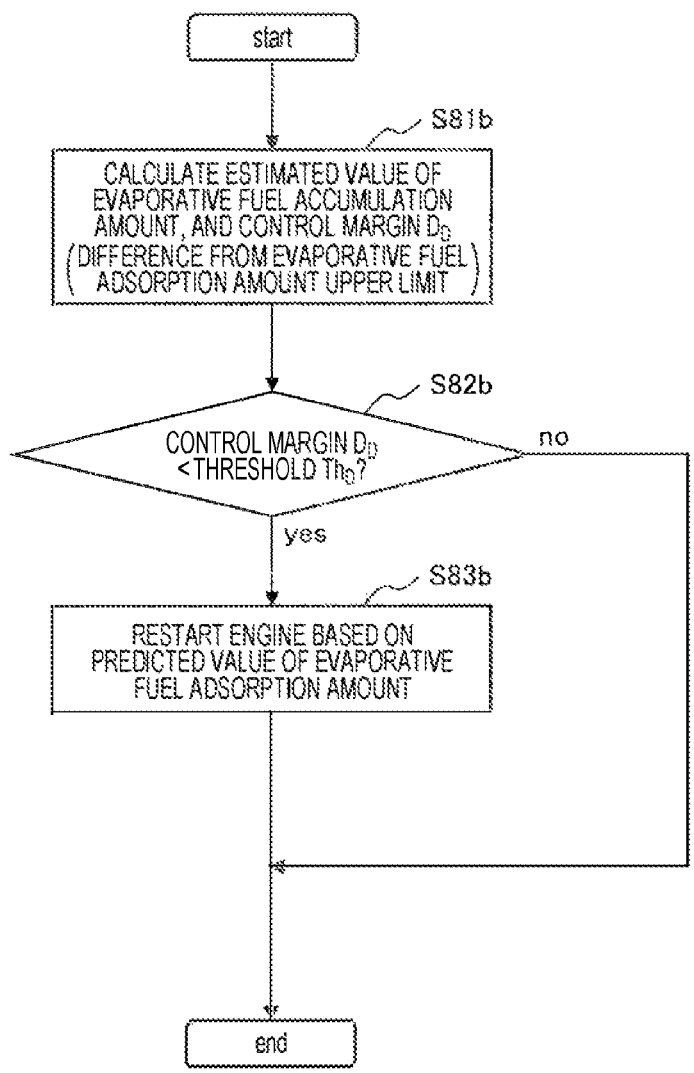
FIG. 12 illustrates another example of the flowchart of step S8 in FIG. 9.
Figure 13A:
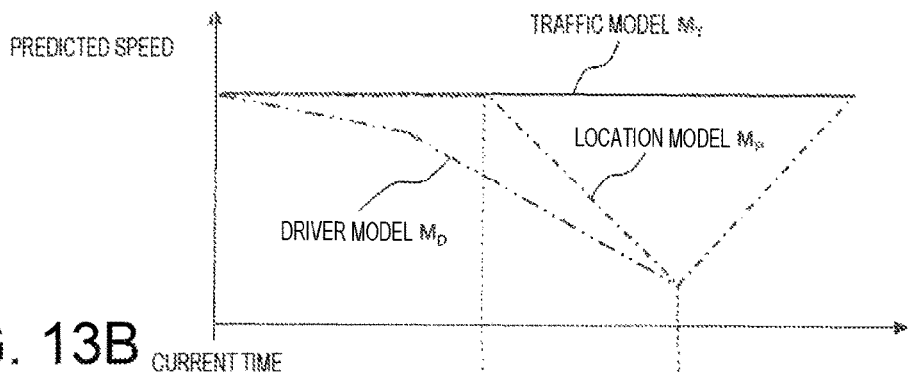
FIGS. 13A to 13E illustrate another example of the time chart of the second embodiment.
Figure 13B:
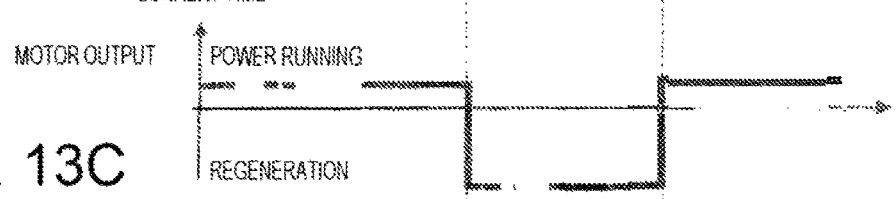
Figure 13C:
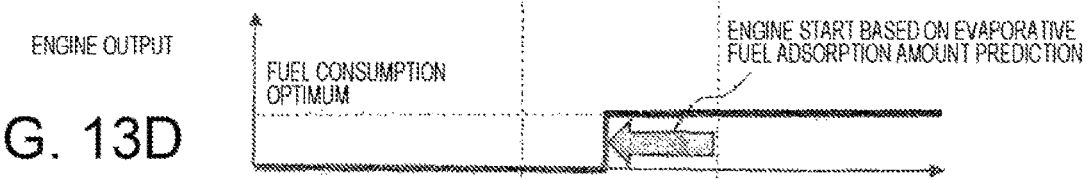
Figure 13D:
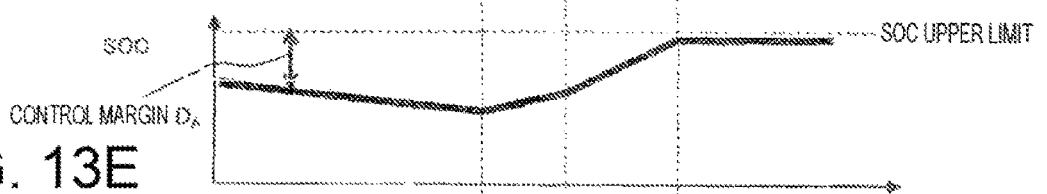
Figure 13E:
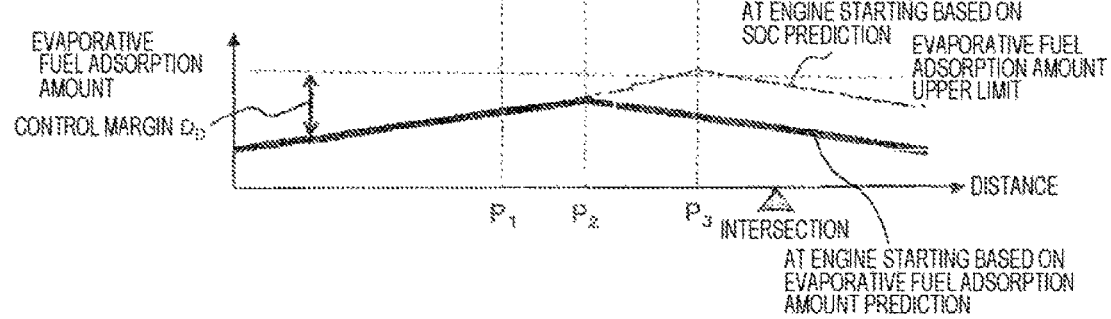

FIG. 12 illustrates an example of a flowchart for determining an engine restart based on an evaporative fuel accumulation amount estimation value, and illustrates step S8 in FIG. 9 in an exploded manner. Here, the evaporative fuel is a fuel volatilized from an engine fuel tank, and temporarily accumulates in a canister while the engine is stopped, and is discharged from the canister while the engine is operating, thereby preventing deterioration of emission.

In step S81b, the evaporative fuel accumulation amount while the engine is stopped is predicted, and further a control margin $D_D$ is calculated. The control margin $D_D$ is a difference between the predicted evaporative fuel accumulation amount and an upper limit of the evaporative fuel accumulation amount.

Then, in step S82b, determination is made whether the control margin $D_D$ is less than the threshold $Th_D$. When the control margin $D_D$ is less than the threshold $Th_D$, in step S83b, in order to prevent the evaporative fuel from being discharged to the atmosphere due to saturation of the adsorbed amount in the canister, or in order to prevent a large purge of the evaporative fuel adsorbed by the canister, control is performed such that the engine restart is performed at a point earlier than the conventional restart point (point at which deceleration ends).

FIG. 13 illustrates an example of a time chart in a case where the engine 2 is restarted based on an estimated value of an evaporative fuel adsorption amount. When the evaporative fuel adsorption amount increases during an engine stop period and a difference between the evaporative fuel adsorption amount at an engine restart point $P_3$ based on the SOC prediction and an evaporative fuel adsorption upper limit is smaller than a predetermined value (see FIG. 12(g)), the engine 2 is restarted at the point $P_2$ before the point $P_3$ (see FIG. 12(c)), and control to release the evaporative fuel is performed. As a result, occurrence of excessive evaporative fuel can be reduced.

In the present embodiment, these controls can prevent the regenerative loss of the SOC, and prevent the decrease in the catalyst temperature due to the stop of the engine and the deterioration of the emission due to the increase in the evaporative fuel adsorption to the canister.

For the sake of simplicity, in the present embodiment, the timing for stopping the engine is determined based on the control margin $D_A$ determined according to the SOC, and the timing for restarting the engine is determined based on the control margin $D_C$ determined according to the catalyst temperature and the control margin $D_D$ determined according to the evaporative fuel adsorption amount. However, the advantageous effect of the present invention does not change even when the optimum control pattern is selected while simultaneously considering both the timings. In addition, as illustrated in FIG. 2, the present invention is also applicable to a case where a plurality of prediction results can be obtained from a single prediction model without having a plurality of prediction models M in order to obtain a plurality of predicted values.

REFERENCE SIGNS LIST 100 powertrain control system
1 vehicle control device
11 fuel consumption information calculation unit
11a control margin calculation unit
12 selection unit
13 powertrain control unit
2 engine
3 generator
4 battery
5 inverter
6 drive motor
$M_T$ traffic model
$M_P$ location model
$M_D$ driver model

The invention claimed is:

1. A vehicle control device, comprising:
a prediction unit configured to predict speeds or accelerations of a vehicle based on a plurality of prediction models;
a fuel consumption information calculation unit configured to calculate fuel consumption for each of a plurality of prediction results obtained by the prediction unit;
a selection unit configured to select any one of the plurality of prediction results;
a powertrain control unit configured to control at least one of an engine, a generator, an inverter, a drive motor, and a transmission of the vehicle based on the prediction result selected by the selection unit; and
a control margin calculation unit configured to calculate a control margin from an upper limit or a lower limit of a control target amount and a predicted control value, wherein
the selection unit selects, based on the control margin, a prediction result indicating a maximum regeneration amount or a prediction result indicating a minimum fuel consumption variation,
the control target amount is a state of charge (SOC) of a battery configured to be charged with direct current (DC) power,
the control margin is a difference between a predicted value and a lower limit of the SOC, and
when the control margin is less than a threshold, the selection unit selects a prediction result indicating a minimum regeneration amount variation during deceleration of the vehicle.

2. The vehicle control device according to claim 1, wherein,
the control margin is a difference between an upper limit and a predicted value of the SOC, and
when the control margin is less than a threshold, the selection unit selects a prediction result indicating a maximum regeneration amount during deceleration of the vehicle.

3. The vehicle control device according to claim 2, wherein
the control target amount is a catalyst temperature of a catalyst that purifies exhaust of the engine,
the control margin is a difference between a predicted value and a lower limit of the catalyst temperature, and
when the control margin is less than a threshold, a timing of restarting the engine in a stopped state is advanced.

4. The vehicle control device according to claim 2, wherein
the control target amount is an evaporative fuel accumulation amount of a fuel to be accumulated in a canister, the fuel being volatilized from a fuel tank of the engine,
the control margin is a difference between an upper limit and a predicted value of the evaporative fuel accumulation amount, and
when the control margin is less than a threshold, a timing of restarting the engine in a stopped state is advanced.

5. The vehicle control device according to claim 1, wherein the plurality of prediction models includes:
a traffic model for prediction of a speed or an acceleration of the vehicle based on traffic information and a speed history or an acceleration history;
a location model for prediction of a speed or an acceleration of the vehicle based on road shape information and a speed history or an acceleration history; and
a driver model for prediction of a speed or an acceleration of the vehicle based on inter-vehicle distance information and a speed history or an acceleration history.

6. A vehicle control method, comprising:
a prediction step of predicting speeds or accelerations of a vehicle based on a plurality of prediction models;
a fuel consumption information calculation step of calculating fuel consumption for each of a plurality of prediction results;
a selection step of selecting any one of the plurality of prediction results;
a powertrain control step of controlling at least one of an engine, a generator, an inverter, a drive motor, and a transmission of the vehicle based on the prediction result selected; and
a control margin calculation step of calculating a control margin from an upper limit or a lower limit of a control target amount and a predicted control value, wherein
the selection step selects, based on the control margin, a prediction result indicating a maximum regeneration amount or a prediction result indicating a minimum fuel consumption variation,
the control target amount is a state of charge (SOC) of a battery configured to be charged with direct current (DC) power,
the control margin is a difference between a predicted value and a lower limit of the SOC, and
when the control margin is less than a threshold, the selection step selects a prediction result indicating a minimum regeneration amount variation during deceleration of the vehicle.

* * * * *